US011079792B2

(12) United States Patent
Ahn et al.

(10) Patent No.: US 11,079,792 B2
(45) Date of Patent: Aug. 3, 2021

(54) DISPLAY PANEL, BRACKET AND DISPLAY DEVICE INCLUDING THE SAME

(71) Applicant: Samsung Display Co., Ltd., Yongin-si (KR)

(72) Inventors: Yi Joon Ahn, Seoul (KR); Sung Chul Kim, Seongnam-si (KR); Jung Hun Noh, Yongin-si (KR); Keun Kyu Song, Seongnam-si (KR); Hye Yong Chu, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/888,259

(22) Filed: May 29, 2020

(65) Prior Publication Data
US 2020/0293084 A1 Sep. 17, 2020

Related U.S. Application Data

(63) Continuation of application No. 15/988,990, filed on May 24, 2018, now Pat. No. 10,671,114.

(30) Foreign Application Priority Data

Aug. 10, 2017 (KR) .................. 10-2017-0101804

(51) Int. Cl.
G06F 1/16 (2006.01)
H04R 7/04 (2006.01)
(Continued)

(52) U.S. Cl.
CPC .......... G06F 1/1605 (2013.01); G06F 1/1626 (2013.01); G06F 1/1652 (2013.01);
(Continued)

(58) Field of Classification Search
CPC .... G06F 1/1605; G06F 1/1652; G06F 1/1626; H04R 1/025; H04R 9/06; H04R 7/045;
(Continued)

(56) References Cited

U.S. PATENT DOCUMENTS 8,934,228 B2    1/2015  Franklin et al.
2006/0270459 A1* 11/2006 Lee .................... H04M 1/03
                                                    455/565
(Continued)

FOREIGN PATENT DOCUMENTS

DE    19955867 A1    6/2001
KR    100612192      8/2006
(Continued)

OTHER PUBLICATIONS

Extended European Search Report for Application No. 18187475.1 dated Dec. 13, 2018.

Primary Examiner — Fan S Tsang
Assistant Examiner — Angelica M McKinney
(74) Attorney, Agent, or Firm — Cantor Colburn LLP

(57) ABSTRACT

A display device incudes: a display panel; a plurality of vibro-acoustic elements coupled to the display panel and spaced apart from each other on a lower surface of the display panel; and a bracket disposed below the display panel and including a bottom plate, where a plurality of receiving holes is defined through the bottom plate. The plurality of vibro-acoustic elements is disposed in the plurality of receiving holes, respectively, a vibration space is defined by a portion of the bottom plate defining a receiving hole of the receiving holes, which is recessed from an upper surface toward a lower surface of the bottom plate, and audio frequencies in different frequency bands, respectively, is produced from regions in which the plurality of vibro-acoustic elements are disposed.

19 Claims, 19 Drawing Sheets

(51) Int. Cl.
*H04N 5/64* (2006.01)
*H04R 1/02* (2006.01)
*H04R 9/06* (2006.01)
*G02F 1/1333* (2006.01)

(52) U.S. Cl.
CPC ............ *H04N 5/642* (2013.01); *H04R 1/025* (2013.01); *H04R 7/045* (2013.01); *H04R 9/06* (2013.01); *G02F 1/133308* (2013.01); *G02F 1/133314* (2021.01); *H04R 2440/07* (2013.01); *H04R 2499/15* (2013.01)

(58) Field of Classification Search
CPC ............ H04R 2499/15; H04R 2440/07; H04N 5/642; G02F 2001/133314; G02F 1/133308
See application file for complete search history.

(56) References Cited

U.S. PATENT DOCUMENTS

| | | | |
|---|---|---|---|
| 2007/0223744 A1* | 9/2007 | Wada | H04R 23/008 381/152 |
| 2009/0103767 A1 | 4/2009 | Kuroda et al. | |
| 2012/0028679 A1 | 2/2012 | Ozasa | |
| 2012/0140969 A1 | 6/2012 | Fujise et al. | |
| 2012/0249459 A1 | 10/2012 | Sashida et al. | |
| 2015/0341714 A1* | 11/2015 | Ahn | G06F 1/1688 381/333 |
| 2016/0050472 A1* | 2/2016 | Lee | H04R 1/028 381/333 |
| 2016/0150318 A1 | 5/2016 | Donarski et al. | |
| 2017/0013334 A1 | 1/2017 | Hidaka et al. | |
| 2017/0280246 A1* | 9/2017 | Choi | H04R 9/06 |
| 2018/0260003 A1* | 9/2018 | Honma | G06F 1/1656 |
| 2018/0317011 A1* | 11/2018 | Choi | H04R 9/06 |
| 2019/0037164 A1* | 1/2019 | Kim | H04R 1/2873 |
| 2019/0141450 A1* | 5/2019 | Yoon | H04R 7/045 |
| 2019/0227603 A1 | 7/2019 | Noh et al. | |
| 2020/0097244 A1* | 3/2020 | Kim | H04R 1/28 |
| 2020/0236452 A1* | 7/2020 | Kim | H04R 17/00 |

FOREIGN PATENT DOCUMENTS

| | | |
|---|---|---|
| KR | 1020080063698 | 7/2008 |
| KR | 101534428 | 7/2015 |
| KR | 1020160021941 | 2/2016 |

* cited by examiner

DISPLAY PANEL, BRACKET AND DISPLAY DEVICE INCLUDING THE SAME

This application is a continuation of U.S. patent application Ser. No. 15/988,990, filed on May 24, 2018, which claims priority to Korean Patent Application No. 10-2017-0101804, filed on Aug. 10, 2017, and all the benefits accruing therefrom under 35 U.S.C. 119, the content of which in its entirety is herein incorporated by reference.

BACKGROUND

1. Field

The disclosure relates to a display panel, a bracket and a display device including the display panel and the bracket.

2. Description of the Related Art

An electronic device that displays an image to a user, such as a smart phone, a digital camera, a laptop computer, a navigation system and a smart television ("TV"), may include a display device for displaying the image. The display device typically includes a display panel for generating and displaying an image, and a bracket disposed below the display panel. The bracket may accommodate elements of the display panel and the like, and may protect the elements of the display panel from heat, external impact and the like.

In such an electronic device, a separate speaker may be provided therein to provide sound in addition the display device.

SUMMARY

Embodiments of the disclosure relate to a display panel to which vibro-acoustic elements are coupled.

Embodiments of the disclosure relate to a display device including a display panel, vibro-acoustic elements are coupled the display panel, and a bracket.

In an embodiment, a display device includes: a display panel; and a plurality of vibro-acoustic elements coupled to the display panel and spaced apart from each other on the display panel, where the plurality of vibro-acoustic elements produces audio frequencies in different frequency bands, respectively.

In another embodiment, a bracket of a display device includes a bottom plate, where a plurality of receiving holes is defined through the bottom plate, and spaced apart from each other, and a portion of the bottom plate defining a receiving hole of the plurality of receiving holes is recessed in a thickness direction of the bottom plate, such that a vibration space is defined by the portion of the bottom plate recessed in the thickness direction.

In another embodiment, a display device incudes: a display panel; a plurality of vibro-acoustic elements coupled to the display panel and spaced apart from each other on a lower surface of the display panel; and a bracket disposed below the display panel and including a bottom plate, where a plurality of receiving holes is defined through the bottom plate. In such an embodiment, the plurality of vibro-acoustic elements is disposed in the plurality of receiving holes, respectively, a vibration space is defined by a portion of the bottom plate defining a receiving hole of the receiving holes, which is recessed from an upper surface toward a lower surface of the bottom plate, and audio frequencies in different frequency bands, respectively, are produced from regions in which the plurality of vibro-acoustic elements is disposed.

According to embodiments of the disclosure, the display device has a sound output function by including a bracket and vibro-acoustic elements.

The effects of the disclosure are not limited to the above-described effects and other effects which are not described herein will become apparent to those skilled in the art from the following description.

BRIEF DESCRIPTION OF THE DRAWINGS

The above and other features of the invention will become more apparent by describing in detail exemplary embodiments thereof with reference to the attached drawings, in which.

DETAILED DESCRIPTION

Figure 1:
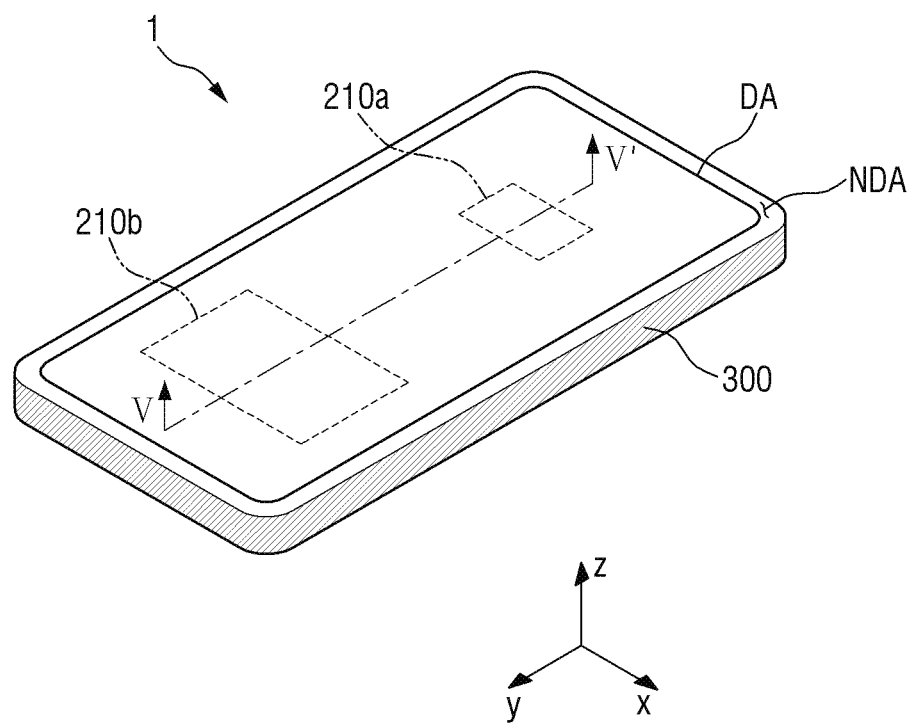
FIG. 1 is a perspective view of a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on," "connected to" or "coupled to" another element or layer, the element or layer can be directly on, directly connected or directly coupled to another element or layer, or intervening elements or layers may be present therebetween. In contrast, when an element is referred to as being "directly on," "directly connected to" or "directly coupled to" another element or layer, there are no intervening elements or layers present. As used herein, connected may refer to elements being physically, electrically and/or fluidly connected to each other.

It will be understood that, although the terms "first," "second," "third," etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings herein.

The terminology used herein is for the purpose of describing particular embodiments only and is not intended to be limiting. As used herein, the singular forms "a," "an" and "the" are intended to include the plural forms as well, including "at least one," unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof. "At least one" is not to be construed as limiting "a" or "an." "Or" means "and/or." As used herein, the term "and/or" includes any and all combinations of one or more of the associated listed items.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described with reference to the accompanying drawings.

Figure 2:
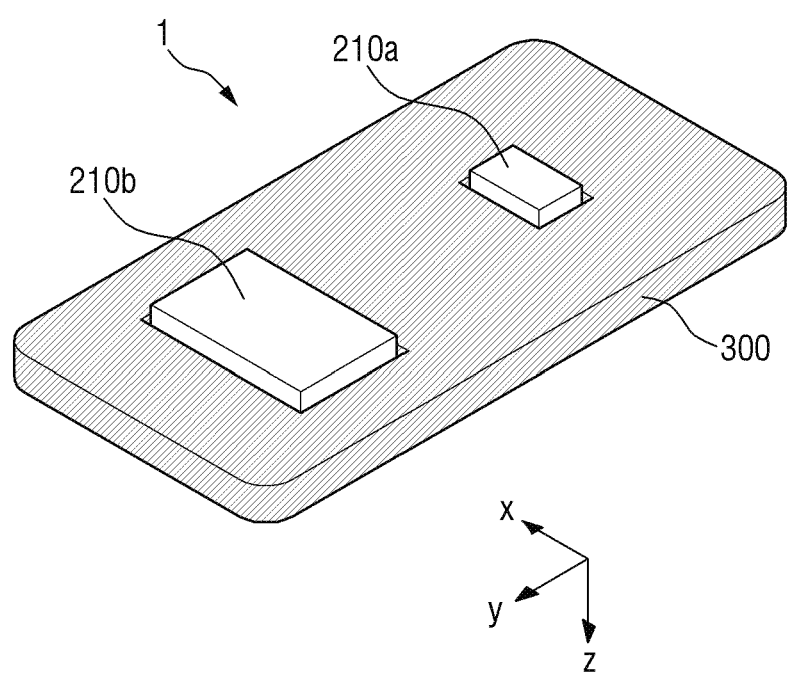
FIG. 2 is a perspective view showing a back side of a bracket 300 of the display device shown in FIG. 1.
Figure 3:
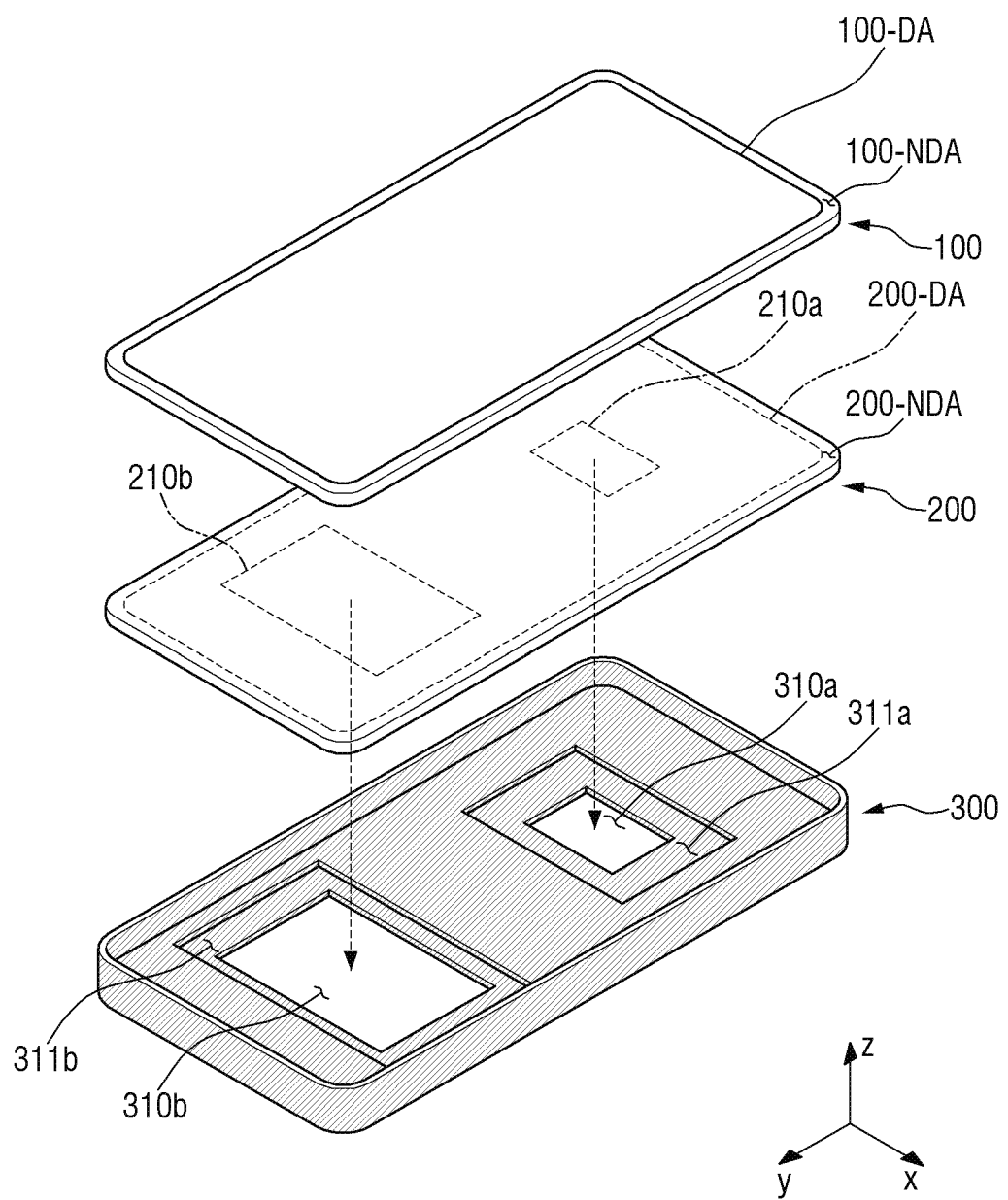
FIG. 3 is an exploded perspective view of the display device 1 shown in FIG. 1.
Figure 4:
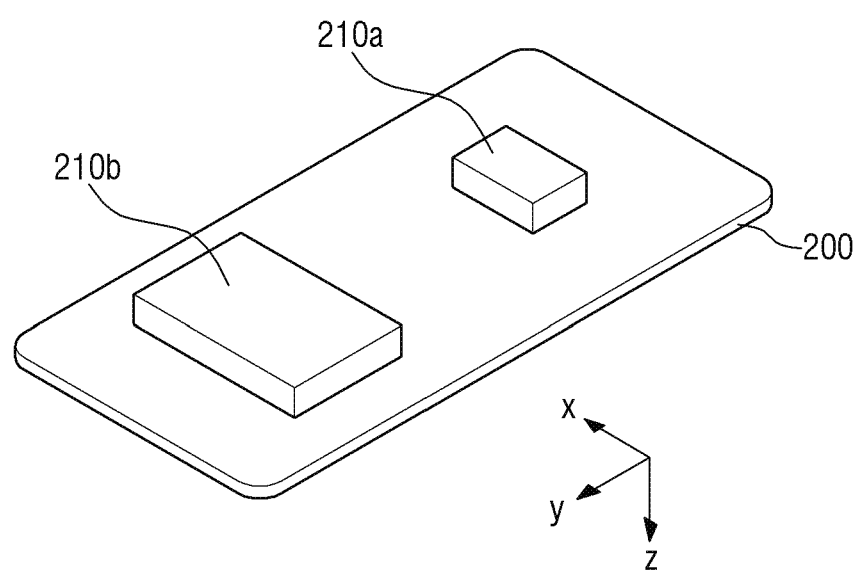
FIG. 4 is a perspective view showing a back side of a display panel shown in FIG. 3.
Figure 5:
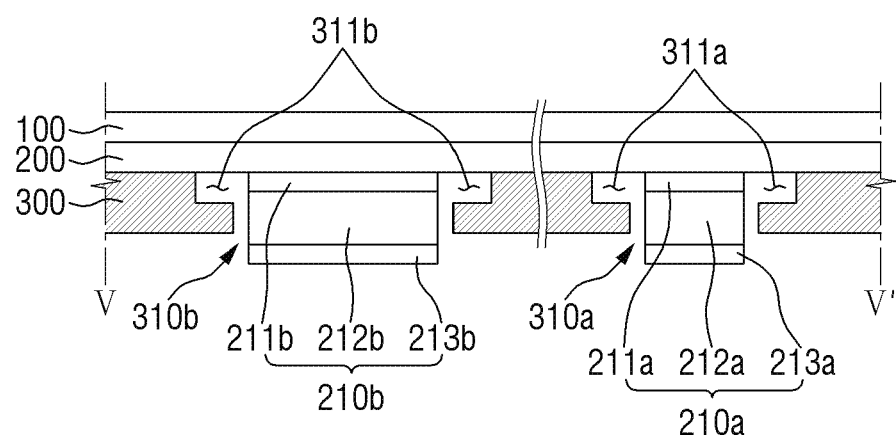
FIG. 5 is a cross-sectional view taken along line V-V' of FIG. 1.

FIG. 1 is a perspective view of a display device 1 according to an embodiment of the disclosure. FIG. 2 is a perspective view showing a back side of a bracket 300 of the display device 1 shown in FIG. 1. FIG. 3 is an exploded perspective view of the display device 1 shown in FIG. 1. FIG. 4 is a perspective view showing a back side of a display panel 200 shown in FIG. 3. FIG. 5 is a cross-sectional view taken along line V-V' of FIG. 1.

FIG. 1 shows an embodiment where the display device 1 is a portable terminal. The portable terminal may include a tablet personal computer ("PC"), a smart phone, a personal digital assistant ("PDA"), a portable multimedia player ("PMP"), a game console, a wristwatch-type electronic device and the like. However, the disclosure is not limited thereto. Alternatively, the display device 1 may be a small and medium-sized electronic device, such as a personal computer, a notebook computer, a car navigation device and a camera, for example, as well as a large electronic apparatus such as a television ("TV") or an external billboard, for example.

Referring to FIG. 1, an embodiment of the display device 1 may have a rectangular-like shape (e.g., a rectangle with rounded corners) in a plan view, e.g., when viewed from a top plan view. The display device 1 may include two opposing short sides extending in a first direction x, and two opposing long sides extending in a second direction y. In an embodiment, a corner, where the long side and the short side of the display device 1 meet each other, may have a right angle, or may be curved as shown in FIG. 1. In embodiments of the disclosure, the planar shape of the display device 1 is not limited to those shown in the accompanying drawings. Alternatively, the planar shape of the display device 1 may be circular or other shapes.

In an embodiment, the display device 1 includes a display area DA for displaying an image and a non-display area NDA adjacent to the display area DA. In some embodiments, the non-display area NDA may surround the display area DA.

The display device 1 may include a plurality of vibro-acoustic elements 210*a* and 210*b* to be described later. The vibro-acoustic elements 210*a* and 210*b* may be an element having a speaker function or a microphone function by being vibrated.

In some embodiments, the plurality of vibro-acoustic elements 210*a* and 210*b* may be disposed in the display area DA, but not being limited thereto. In an alternative embodiment, a part of the plurality of vibro-acoustic elements 210*a* and 210*b* may be disposed in the display area DA and another part thereof may be disposed in the non-display area NDA. In another alternative embodiment, all of the plurality of vibro-acoustic elements 210a and 210b may be disposed in the non-display area NDA. In another alternative embodiment, the plurality of vibro-acoustic elements 210a and 210b may be disposed over the display area DA and the non-display area NDA. The plurality of vibro-acoustic elements 210a and 210b will be described later in greater detail.

Referring to FIGS. 1 to 5, an embodiment of the display device 1 includes the display panel 200 and the plurality of vibro-acoustic elements 210a and 210b disposed on a lower surface of the display panel 200. The display device 1 may further include a bracket 300 disposed below the display panel 200. The display device 1 may further include a window 100 disposed on the display panel 200. Although not shown in the figures, the display device 1 may further include an input sensing member (e.g., a touch panel) disposed between the display panel 200 and the window 100.

Unless defined otherwise, the terms "above", "top" and "upper" as used herein refer to a display surface side with respect to the display panel 200 (i.e., a third direction z), and the terms "below", "bottom" and "lower" as used herein refer to an opposite side of the display surface with respect to the display panel 200 (i.e., an opposite direction to the third direction z).

The window 100 may include a light transmitting portion 100-DA for transmitting an image displayed by the display panel 200, and a light shielding portion 100-NDA adjacent to the light transmitting portion 100-DA. In some embodiments, an inner surface of the light shielding portion 100-NDA of the window 100 may have an opaque masking layer.

The window 100 may be disposed above the display panel 200 to protect the display panel 200. The window 100 may overlap the display panel 200 and cover the entire top surface of the display panel 200. The window 100 may be larger than the display panel 200. In one embodiment, for example, the window 100 may have short sides extending further from the display panel 200 at both short sides of the display device 1, and long sides extending further from the display panel 200 at both long sides of the display device 1. However, a distance between corresponding short sides of the window 100 and the display panel 200 may be larger than that between corresponding long sides thereof.

The window 100 may include or be made of glass, sapphire, plastic or the like. The window 100 may be rigid, but not being limited thereto. Alternatively, the window 100 may be flexible.

The display panel 200 includes a display portion 200-DA and a non-display portion 200-NDA. The display portion 200-DA is an area for displaying an image, and corresponds to or overlaps the light transmitting portion 100-DA of the window 100. The non-display portion 200-NDA, which is an area where no image is displayed, is adjacent to the display portion 200-DA, and corresponds to or overlaps the light shielding portion 100-NDA of the window 100.

The display panel 200 may include a structure in which a driving element, such as a thin film transistor, and a display element are disposed on a base substrate including a glass, a polymer or the like.

In some embodiments, the display panel 200 may be a display panel including a self-luminous element as a display element. In one embodiment, for example, the display panel 200 includes a display panel including an organic light emitting diode in which an organic light emitting layer is included as a light emitting layer, or a display panel including a quantum dot light emitting diode in which a quantum dot light emitting layer is included as a light emitting layer. However, the disclosure is not limited thereto. According to an alternative embodiment of the disclosure, the display panel 200 may be implemented as a liquid crystal display panel or the like. Hereinafter, for convenience of description, embodiments where the display panel 200 is a display panel including an organic light emitting diode will be described.

In some embodiments, the display panel 200 may include a touch electrode portion therein. In such embodiments, a separate input sensing member, typically disposed between the window 100 and the display panel 200, may be omitted.

The display panel 200 may further include a lower panel member (not shown) disposed below the display panel 200. The lower panel member may be is a member provided for a heat dissipation function, an electromagnetic wave shielding function, a light shielding or light absorbing function, a buffering function, a digitizing function and the like, and the lower panel member may include a functional layer having at least one of the functions described above. The functional layer may be provided in various forms such as a layer, a film, a sheet, a plate, a panel and the like.

In an embodiment, the plurality of vibro-acoustic elements 210a and 210b is disposed below the display panel 200. The vibro-acoustic elements 210a and 210b are elements that vibrate in response to a signal including audio data, which is an electrical signal corresponding to the audio data. The vibro-acoustic elements 210a and 210b may include, for example, a magnet and a coil surrounding the magnet to allow a current corresponding to the acoustic signal to flow therethrough. The vibro-acoustic elements 210a and 210b may vibrate by an electromagnetic force corresponding to a current flowing in the coil. However, the disclosure is not limited thereto. In an alternative embodiment, the vibro-acoustic elements 210a and 210b may be piezoelectric elements including a vibration material layer. In such an embodiment, the vibration material layer may be mechanically deformed in response to the acoustic signal, and the vibro-acoustic elements 210a and 210b may vibrate by the mechanical deformation. The vibration material layer may include at least one of a piezoelectric material, polyvinylidene fluoride ("PVDF") and an electroactive polymer, for example. Hereinafter, for convenience of description, embodiments where the vibro-acoustic elements 210a and 210b are piezoelectric elements including a vibration material layer will be described.

In such embodiments where the vibro-acoustic elements 210a and 210b are piezoelectric elements, as shown in FIG. 5, the vibro-acoustic elements 210a and 210b may include electrodes 211 and 213 opposite to each other, and vibration material layers 212a and 212b located therebetween. In an embodiment, each of the vibro-acoustic elements 210a and 210b include a first electrode 211a or 211b disposed below the display panel 200, a vibration material layer 212a or 212b disposed below the first electrode 211a or 211b, and a second electrode 213a or 213b disposed below the vibration material layer 212a or 212b. The first electrodes 211a and 211b may be in contact with the lower surface of the display panel 200.

The first electrode 211a or 211b and the second electrode 213a or 213b provide an electric field to the vibration material layer 212a or 212b. The first electrodes 211a and 211b and the second electrodes 213a and 213b may include or be formed of a conductive material. In one embodiment, for example, the conductive material may be a transparent conductor, such as indium tin oxide ("ITO") and indium zinc oxide ("IZO"), an opaque metal, a conducting polymer, carbon nanotubes ("CNT"s) or the like.

The vibration material layers 212a and 212b include a piezo material that vibrates when an electric field provided by the first electrodes 211a and 211b and the second electrodes 213a and 213b is applied thereto. In an embodiment, the piezoelectric material includes at least one of a piezoelectric material such as a PVDF film and a lead zirconate titanate ("PZT") ceramic, and an electroactive polymer.

In an embodiment, the plurality of vibro-acoustic elements 210a and 210b is coupled to the lower surface of the display panel 200. In such an embodiment, the plurality of vibro-acoustic elements 210a and 210b may be disposed directly on the lower surface of the display panel 200 as shown in FIG. 4. In an alternative embodiment, the plurality of vibro-acoustic elements 210a and 210b are attached to the lower surface of the display panel 200 through a separate adhesive member or the like provided therebetween.

In an embodiment, the plurality of vibro-acoustic elements 210a and 210b may be coupled to a base substrate of the display panel 200. In an embodiment, where the lower panel member is provided, the plurality of vibro-acoustic elements 210a and 210b may be coupled to the lower panel member. In such an embodiment, the plurality of vibro-acoustic elements 210a and 210b may be disposed in direct contact with the lowermost layer or surface of the display panel 200. However, the disclosure is not limited thereto. In an embodiment of the invention, the plurality of vibro-acoustic elements 210a and 210b may be directly or indirectly coupled to the display panel 200.

The vibro-acoustic elements 210a and 210b may vibrate in response to a voltage applied thereto, and a vibration of the vibro-acoustic elements 210a and 210b may be transmitted to the display panel 200 coupled thereto such that the display panel 200 vibrates. In an embodiment, at least a part of the display panel 200 may function as a diaphragm that outputs sound in response to the vibration of the vibro-acoustic elements 210a and 210b.

The plurality of vibro-acoustic elements 210a and 210b may include, or be divided into, a first vibro-acoustic element 210a and a second vibro-acoustic element 210b. The first vibro-acoustic element 210a and the second vibro-acoustic element 210b may be spaced apart from each other on the lower surface of the display panel 200. The first and second vibro-acoustic elements 210a and 210b may be disposed side by side along a predetermined direction, e.g., the second direction y, but not being limited thereto.

The first vibro-acoustic element 210a and the second vibro-acoustic element 210b may vibrate with different frequencies or produces audio frequencies in different frequency bands. In an embodiment, the plurality of vibro-acoustic elements 210a and 210b may produce an audio frequency in a range of about 20 hertz (Hz) to about 20 kilohertz (kHz). In an embodiment, the first vibro-acoustic element 210a may produce an audio frequency in a relatively high frequency band while the second vibro-acoustic element 210b may produce an audio frequency in a relatively low frequency band.

In some embodiments, the audio frequency of the high frequency band produced by the first vibro-acoustic element 210a may be in a range of about 2 kHz to about 20 kHz, and the audio frequency of the low frequency band produced by the second vibro-acoustic element 210b may be in a range of about 20 Hz to about 2 kHz. However, the disclosure is not limited thereto. In some embodiment, the audio frequency of the high frequency band produced by the first vibro-acoustic element 210a and the audio frequency of the low frequency band produced by the second vibro-acoustic element 210b may be slightly deviated from the above ranges, and in such embodiments, the audio frequency of the high frequency band produced by the first vibro-acoustic element 210a and the audio frequency of the low frequency band produced by the second vibro-acoustic element 210b may be considered as being substantially within the above range. In an embodiment, the audio frequencies produced by the first vibro-acoustic element 210a and the audio frequencies produced by the second vibratory acoustic element 210b may partially overlap each other.

The first and second vibro-acoustic elements 210a and 210b may have different sizes from each other to produce audio frequencies in different frequency bands, respectively. The size of the vibro-acoustic elements 210a and 210b may mean an area thereof when viewed from a plan view in a direction opposite to the third direction z, or an overlapping area of each of the vibro-acoustic elements 210a and 210b with the display panel 200. In an embodiment, as shown in FIG. 4, the size of the first vibro-acoustic element 210a is smaller than that of the second vibro-acoustic element 210b, and the first vibro-acoustic element 210a may produce an audio frequency in a higher frequency band than that of an audio frequency produced by the second vibro-acoustic element 210b.

As described above, since the vibro-acoustic element produces sound in a specific audio frequency band depending on the size thereof, sounds of various frequency bands may not be effectively produced by using a single vibro-acoustic element. In an embodiment, a plurality of vibro-acoustic elements is included in the display device for producing audio frequencies in different frequency bands, respectively, or audio frequencies in a wide frequency band, such that sounds having various or wide frequency bands may be realized by using a plurality of vibro-acoustic elements.

In an embodiment, as shown in FIGS. 1-3 and 5, the bracket 300 may be disposed below the display panel 200. The bracket 300 accommodates the window 100 and the display panel 200. The bracket 300 may include a bottom plate and sidewalls connected to edges of the bottom plate. The top surface of the bottom plate of the bracket 300 may face the bottom surface of the display panel 200 and the sidewalls of the bracket 300 may face the side surfaces of the display panel 200 and the window 100.

In some embodiments, the bracket 300 may include or be made of a synthetic resin material, a metal material, or a combination of different materials.

In some embodiments, a portion of the bracket 300 may be exposed outside through a side of the display device 1 to define an outer side surface of the display device 1. In some embodiments, an outer housing (not shown) may be coupled to the bottom of the bracket 300.

A plurality of receiving holes 310a and 310b may be defined in the bottom plate of the bracket 300. The plurality of receiving holes 310a and 310b may be formed through the bottom plate, and may be spaced apart from each other.

The plurality of receiving holes 310a and 310b may be holes in which the plurality of vibro-acoustic elements 210a and 210b is disposed. In an embodiment, the plurality of receiving holes 310a and 310b may be defined at positions corresponding to the plurality of vibro-acoustic elements 210a and 210b, respectively. Each of the receiving holes 310a and 310b may have a size capable of accommodating the corresponding one of the vibro-acoustic elements 210a and 210b. In an embodiment, as shown in FIG. 5, when the display panel 200 is accommodated in the bracket 300, the first and second vibro-acoustic elements 210a and 210b are received in the first and second receiving holes 310a and 310b, respectively. Accordingly, the display panel 200 may be accommodated in the bracket 300 to minimize or substantially decrease a height difference due to the plurality of vibro-acoustic elements 210a and 210b.

Each of the receiving holes 310a and 310b may have a different through area, which is a cross-sectional area in a direction perpendicular to the third direction z, depending on the size of the corresponding one of the vibro-acoustic elements 210a and 210b. However, the disclosure is not limited thereto.

In an embodiment, the bracket 300 and the plurality of vibro-acoustic elements 210a and 210b may be spaced apart from each other by a predetermined distance without being in contact with each other, such that a space is secured for vibration of the vibro-acoustic elements 210a and 210b, that is, the vibro-acoustic elements 210a and 210b is effectively prevented from contacting the bracket 300 when vibrating. In such an embodiment, each of the plurality of receiving holes 310a and 310b may have a larger size than that of the corresponding one of the vibro-acoustic elements 210a and 210b.

In an embodiment, the thickness of the plurality of vibro-acoustic elements 210a and 210b may be greater than the thickness of the bracket 300. In such an embodiment, as shown in FIGS. 2 and 5, the plurality of vibro-acoustic elements 210a and 210b may protrude further downward (in the opposite direction to the third direction z) than the lower surface of the bracket 300, but the disclosure is not limited thereto.

In an embodiment, vibration spaces 311a and 311b are defined by recessed portions of the bottom plate, which are around the receiving holes 310a and 310b and recessed in a thickness direction (opposite direction to the third direction z), i.e., from the top surface toward the bottom surface of the bottom plate. The vibration spaces 311a and 311b may be defined by portions of the bottom plate having a groove shape in which peripheral portions of the bottom plate defining the receiving holes 310a and 310b are recessed to have a thickness less than a thickness of other portions of the bottom plate. The vibration spaces 311a and 311b may be formed in the periphery of one or more of the receiving holes 310a and 310b. In an embodiment, as shown in FIG. 5, a first vibration space 311a is defined in the periphery of the first receiving hole 310a, and a second vibration space 311b is defined in the periphery of the second receiving hole 310b. In an embodiment, the vibration space of a vibro-acoustic element is defined by a space between the recessed portion of the bottom plate defining a receiving hole that receives the vibro-acoustic element, a portion of the display panel 200 overlapping the recessed portion in the thickness direction, and the vibro-acoustic element.

The vibration spaces 311a and 311b may serve as a sound box for amplifying vibrations or sound waves generated from the vibro-acoustic elements 210a and 210b located in the receiving holes 310a and 310b. The first vibration space 311a may serve as a sound box for the first vibro-acoustic element 210a, and the second vibration space 311b may serve as a sound box for the second vibro-acoustic element 210b. In such an embodiment, the greater the vibration spaces 311a and 311b, the greater the effect of amplifying sound waves or vibrations in the low frequency band. Thus, the vibration spaces 311a and 311b may serve to enhance the characteristics of the low frequency band.

The size of the vibration spaces 311a and 311b may mean the volume of the vibration spaces 311a and 311b. The volume of the vibration spaces 311a and 311b may vary depending on the planar area and depth of the recessed portion of the bottom plate defining the vibration spaces 311a and 311b. In some embodiments, the first vibration space 311a and the second vibration space 311b may have a same volume as each other, but the disclosure is not limited thereto. In an alternative embodiment, the vibration spaces 311a and 311b may have different volumes from each other to produce audio frequencies in various frequency bands.

In an embodiment, as shown in the figures, the vibro-acoustic elements 210a and 210b, the receiving holes 310a and 310b and the vibration spaces 311a and 311b therearound have a rectangular shape in a plan view, but the disclosure is not limited thereto. In an alternative embodiment, the vibro-acoustic elements 210a and 210b may have various shapes such as a polygonal shape and a curved shape in a plan view. The receiving holes 310a and 310b and the vibration spaces 311a and 311b may have various shapes corresponding to the shapes of the vibro-acoustic elements 210a and 210b.

Figure 6:
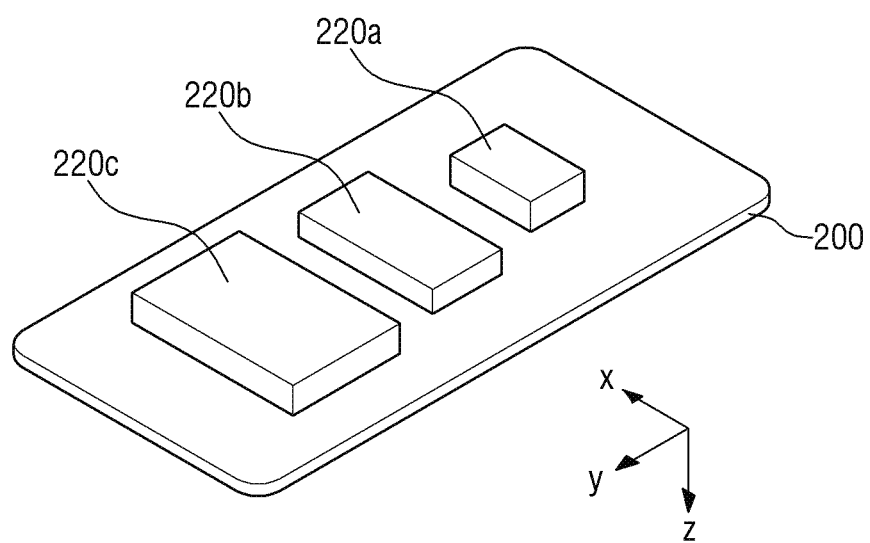
FIGS. 6 and 7 are perspective views of a display panel and vibro-acoustic elements of a display device according to alternative embodiments of the disclosure.

FIG. 6 is a perspective view of the display panel 200 and vibro-acoustic elements 220a, 220b and 220c of a display device according to an alternative embodiment of the disclosure. In FIG. 6, the back side of the display panel 200 is illustrated. The display device of FIG. 6 is substantially the same as the display device described with reference to FIGS. 1 to 5 except that a plurality of vibro-acoustic elements 220a, 220b and 220c include first, second and third vibro-acoustic elements 220a, 220b and 220c. For convenience of description, any repetitive detailed description of a same element will be omitted and differences will be mainly described.

Referring to FIG. 6, in an embodiment, the plurality of vibro-acoustic elements 220a, 220b and 220c may include a first vibro-acoustic element 220a which produces an audio frequency of a high frequency band, a second vibro-acoustic element 220b which produces an audio frequency of a middle frequency band, and a third vibro-acoustic element 220c which produces an audio frequency of a low frequency band.

In an embodiment, the audio frequency of the high frequency band produced by the first vibro-acoustic element 220a may be in a range of about 2 kHz to about 20 kHz, the audio frequency of the middle frequency band produced by the second vibro-acoustic element 220b is in a range of about 500 Hz to about 2 kHz, and the audio frequency of the low frequency band produced by the third vibro-acoustic element 220c may be in a range of about 20 Hz to about 500 Hz. However, the disclosure is not limited thereto. In some embodiment, the audio frequency of the high frequency band produced by the first vibro-acoustic element 220a, the audio frequency of the middle frequency band produced by the second vibro-acoustic element 220b and the audio frequency of the low frequency band produced by the third vibro-acoustic element 220c may be slightly deviated from the above ranges, and in such embodiments, the audio frequency of the high frequency band produced by the first vibro-acoustic element 220a, the audio frequency of the middle frequency band produced by the second vibro-acoustic element 220b and the audio frequency of the low frequency band produced by the third vibro-acoustic element 220c may be considered as being substantially within the above range. In an embodiment, the frequencies produced by each of the vibro-acoustic elements 220a, 220b and 220c and the frequencies produced by another one of the vibro-acoustic elements 220a, 220b and 220c may partially overlap each other.

In an alternative embodiment, the frequencies produced by the first, second and third vibro-acoustic elements 220a, 220b, and 220c may have relative values to each other without being limited to specific values. In such an embodiment, the first vibro-acoustic element 220a produces an audio frequency of a relatively high or higher frequency band than the second vibro-acoustic element 220b, and the second vibro-acoustic element 220b produces an audio frequency of a relatively high or higher frequency band than the third vibro-acoustic element 220c, the frequency values may not be limited to a frequency within a specific range.

The first, second and third vibro-acoustic elements 220a, 220b and 220c may be sequentially arranged. Specifically, the first, second and third vibro-acoustic elements 220a, 220b, and 220c may be sequentially arranged on the display panel 200 along a predetermined direction, e.g., the second direction y, as shown in FIG. 6. However, the disclosure is not limited thereto and the arrangement thereof may be variously changed.

The first, second and third vibro-acoustic elements 220a, 220b, and 220c have different sizes from each other as described above, thereby producing frequencies in different frequency bands. In an embodiment, the vibro-acoustic element that produced the frequency of a higher frequency band may have a smaller size. Accordingly, the first vibro-acoustic element 220a that produces an audio frequency in the highest frequency band may have the smallest size, and the third vibro-acoustic element 220c that produces an audio frequency in the lowest frequency band may have the largest size.

In an embodiment, as described above, the vibro-acoustic elements for outputting high, middle and low frequencies, respectively, are provided, thereby effectively producing audio frequencies that cover all of high, middle and low frequency bands.

Figure 7:
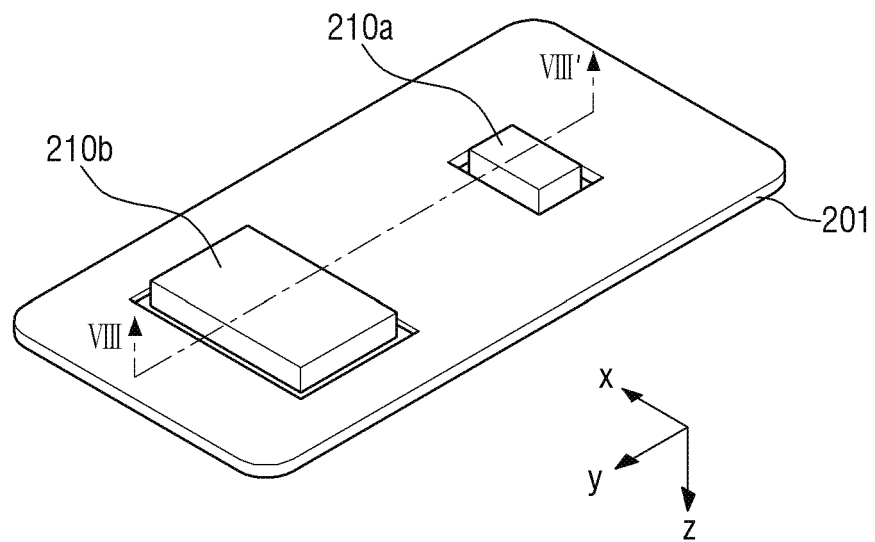
Figure 8:
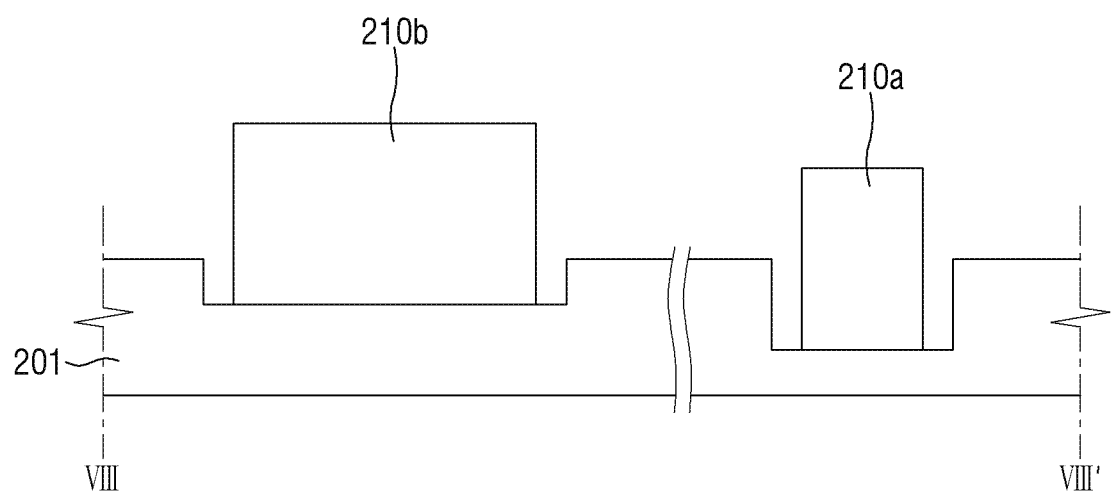
FIG. 8 is a cross-sectional view taken along line VIII-VIII' of FIG. 7.

FIG. 7 is a perspective view of a display panel 201 and vibro-acoustic elements 210a and 210b of a display device according to another alternative embodiment of the disclosure. FIG. 8 is a cross-sectional view taken along line VIII-VIII' of FIG. 7. In FIG. 7, the back side of the display panel 201 is illustrated. The display device of FIGS. 7 and 8 is substantially the same as the display device described with reference to FIGS. 1 to 5 except that portions of the display panel 201 corresponding to the plurality of vibro-acoustic elements 210a and 210b are recessed. For convenience of description, any repetitive detailed description of a same element will be omitted and differences will be mainly described.

Referring to FIGS. 7 and 8, an embodiment of the display panel 201 may to have a shape in which portions of the display panel 201 corresponding to (or overlapping) the plurality of vibro-acoustic elements 210a and 210b are recessed in the thickness direction (opposite direction to the z direction), i.e., from the lower surface toward the upper surface of the display panel 201. Thus, in such an embodiment of the display panel 201, the portions corresponding to the plurality of vibro-acoustic elements 210a and 210b may be thinner than the other portions. In an embodiment, the recessed portions of the display panel 201 may be formed by partially etching the base substrate located in the lower layer of the display panel 201.

In such an embodiment, where the thickness of the portions corresponding to the vibro-acoustic elements 210a and 210b is thinner than the other portions, the display panel 201 may vibrate with a greater amplitude due to the vibration provided from the vibro-acoustic elements 210a and 210b, thereby improving the sound output performance of the display device.

In such an embodiment, since the frequency band to be amplified may vary depending on the thickness of the display panel 201, as shown in FIG. 8, the recessed depth of a portion corresponding to the first vibro-acoustic element 210a may be different from the recessed depth of a portion corresponding to the second vibro-acoustic element 210b. However, the disclosure is not limited thereto, and alternatively, the recessed depths of the portions corresponding to the vibro-acoustic elements 210a and 210b may be equal to each other.

Figure 9:
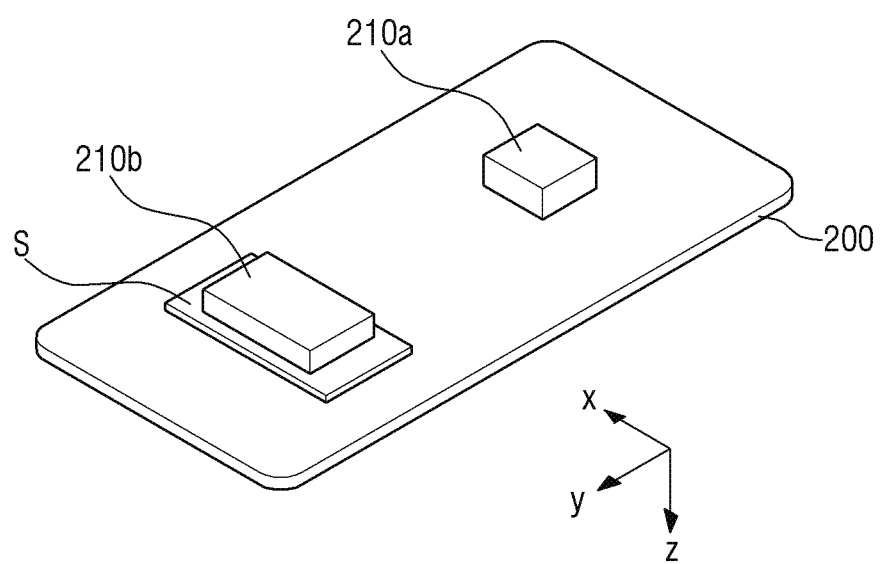
FIGS. 9 and 10 are perspective views of a display panel and vibro-acoustic elements of a display device according to another alternative embodiment of the disclosure.

FIG. 9 is a perspective view of a display panel 200 and vibro-acoustic elements 210a and 210b of a display device according to another alternative embodiment of the disclosure. In FIG. 9, the back side of the display panel 200 is illustrated. The display device of FIG. 9 is substantially the same as the display device described with reference to FIGS. 1 to 5 except a vibration reinforcing member disposed between the second vibro-acoustic element 210b and the display panel 200. For convenience of description, any repetitive detailed description of a same element will be omitted and differences will be mainly described.

Referring to FIG. 9, in an embodiment, the display device further includes a vibration reinforcing member S disposed between the display panel 200 and the second vibro-acoustic element 210b which produces an audio frequency of a low frequency band. The vibration reinforcing member S may reinforce the strength of the vibration of the display panel provided from the vibro-acoustic elements 210a and 210b and allow the display panel 200 to more accurately respond to the vibration of the vibro-acoustic elements 210a and 210b. In such an embodiment, the vibration reinforcing member S may improve the vibration of the low frequency band provided from the second vibro-acoustic element 210b.

The vibration reinforcing member S may include or be formed of a metal plate, a foam layer, a supporting material or reinforcing structure, or a combination thereof.

The vibration reinforcing member S may be coupled to both the display panel 200 disposed thereon and the second vibro-acoustic element 210b disposed therebelow, thereby maintaining a state where the second vibro-acoustic element 210b is coupled to the display panel 200.

In an embodiment, as shown in FIG. 9, the vibration reinforcing member S may be disposed only in the second vibro-acoustic element 210b, but the disclosure is not limited thereto. In an alternative embodiment, the vibration reinforcing member S may be disposed between the first vibro-acoustic element 210a and the display panel 200 to reinforce the output of the first vibro-acoustic element 210a.

Figure 10:
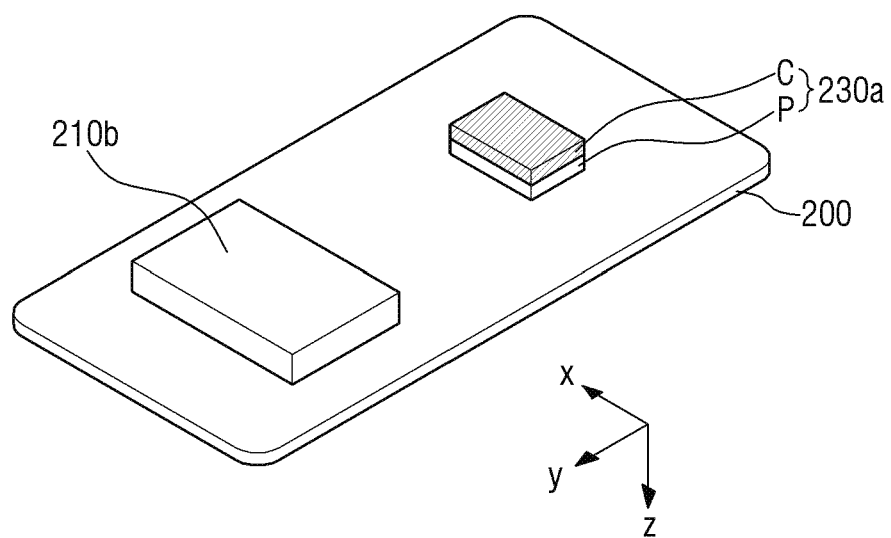

FIG. 10 is a perspective view of a display panel 200 and vibro-acoustic elements 230a and 210b of a display device according to still another alternative embodiment of the disclosure. In FIG. 10, the back side of the display panel 200 is illustrated. The display device of FIG. 10 is substantially the same as the display device described with reference to FIGS. 1 to 5 except that the first vibro-acoustic element 230a includes both a coil C and a piezoelectric element P. For convenience of description, any repetitive detailed description of a same element will be omitted and differences will be mainly described.

Referring to FIG. 10, in an embodiment, the first vibro-acoustic element 230a which produces an audio frequency of a high frequency band may include both the coil C and the piezoelectric element P. As the first vibro-acoustic element 230a includes both the coil C and the piezoelectric element P, the output of the high frequency band may be improved.

In an embodiment, as shown in FIG. 10, the piezoelectric element P may be disposed on the lower surface of the display panel 200, and the coil C may be disposed on the piezoelectric element P. However, the disclosure is not limited thereto. In an alternative embodiment, the coil C may be disposed on the lower surface of the display panel 200, and the piezoelectric element P may be disposed on the coil C.

In an embodiment, as described above, the first vibro-acoustic element 230a includes both the coil C and the piezoelectric element P, but the disclosure is not limited thereto. In an alternative embodiment, the second vibro-acoustic element 210b may also include both a coil and a piezoelectric element.

Figure 11:
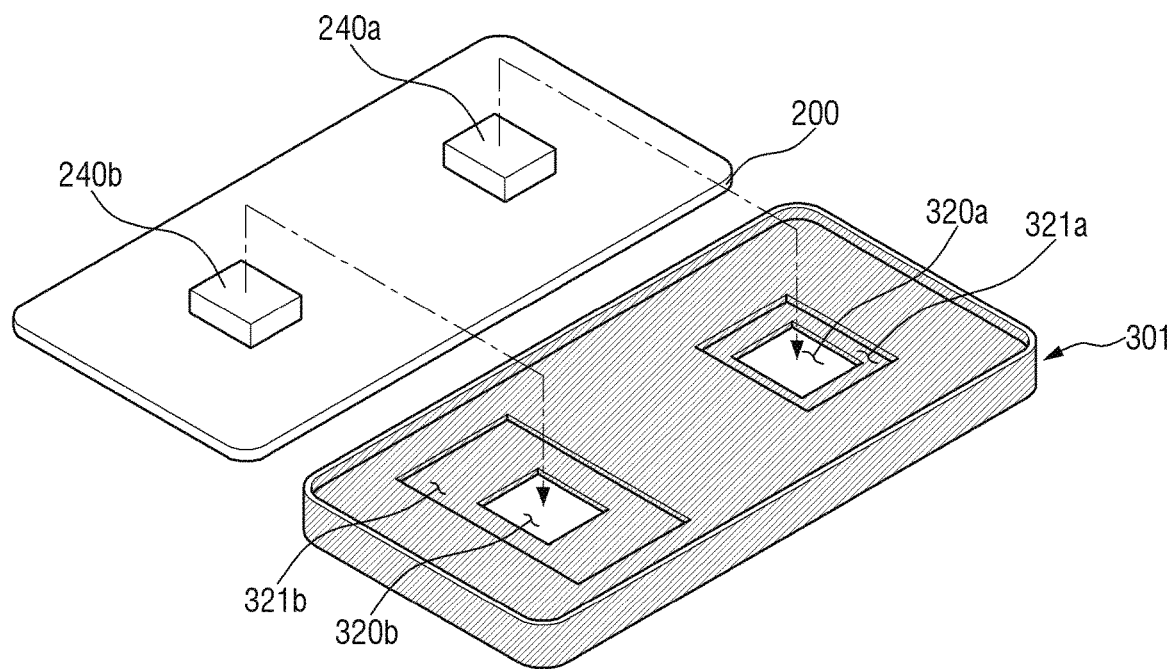
FIGS. 11 and 12 are perspective views of a display panel, vibro-acoustic elements and a bracket of a display device according to another alternative embodiment of the disclosure.

FIG. 11 is a perspective view of a display panel 200, vibro-acoustic elements 240a and 240b and a bracket 301 of a display device according to still another alternative embodiment of the disclosure. In FIG. 11, the back side of the display panel 200 and the front side of the bracket 301 are illustrated respectively. The display device of FIG. 11 is substantially the same as the display device described with reference to FIGS. 1 to 5 except that the plurality of vibro-acoustic elements 240a and 240b have the same size as each other, and the plurality of vibration spaces 321a and 321b defined in the bracket 301 have different sizes from each other. For convenience of description, any repetitive detailed description of a same element will be omitted and differences will be mainly described.

Referring to FIG. 11, the first vibro-acoustic element 240a and the second vibro-acoustic element 240b have the same size as each other, while the first vibration space 321a and the second vibration space 321b defined in the bracket 301 may have different sizes from each other. In an embodiment, the size of the first vibration space 321a corresponding to the first vibro-acoustic element 240a may be smaller than the size of the second vibration space 321b corresponding to the second vibro-acoustic element 240b.

As shown in FIG. 11, in an embodiment, only the sizes of the first and second vibration spaces 321a and 321b defined in the bracket 301 are different from each other, and the frequency bands of the audio frequencies produced from regions where the first and second vibro-acoustic elements 240a and 240b are disposed may become different from each other. In such an embodiment, the sizes of a plurality of receiving holes 320a and 320b defined in the bottom plate of the bracket 300 may be the same as each other. In an embodiment, as the size of the vibration spaces 321a and 321b is smaller, an audio frequency of a higher frequency band may be produced.

In an embodiment, as described above, the size of the vibro-acoustic elements 240a and 240b may be defined as an area where the vibro-acoustic elements 240a and 240b overlap the display panel 200, and the size of the vibration spaces 321a and 321b may be defined as the volume of the vibration spaces 321a and 321b.

Figure 12:
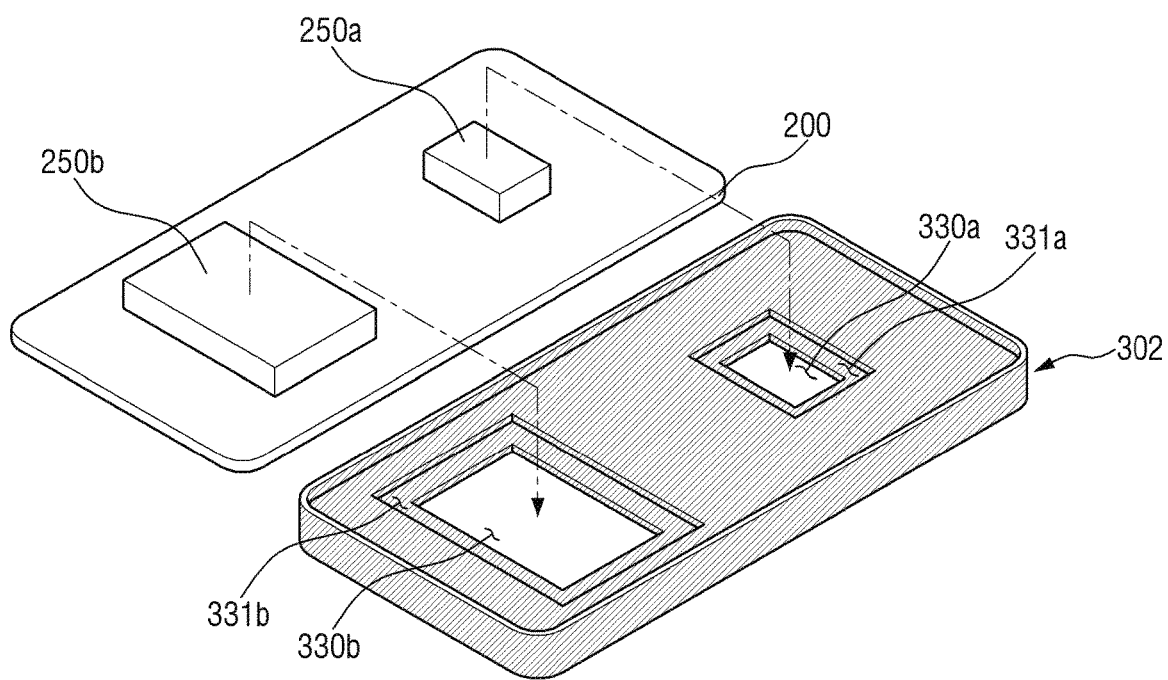

FIG. 12 is a perspective view of a display panel 200, vibro-acoustic elements 250a and 250b and a bracket 302 of a display device according to still another embodiment of the disclosure. In FIG. 12, the back side of the display panel 200 and the front side of the bracket 302 are illustrated respectively. The display device of FIG. 12 is substantially the same as the display device described with reference to FIGS. 1 to 5 except that all of a plurality of vibro-acoustic elements 250a and 250b and a plurality of vibration spaces 331a and 331b have different sizes from each other. For convenience of description, any repetitive detailed description of a same element will be omitted and differences will be mainly described.

Referring to FIG. 12, in an embodiment, the first vibro-acoustic element 250a and the second vibro-acoustic element 250b may have different sizes from each other, and the first vibration space 331a and the second vibration space 331b defined in the bracket 302 may also have different sizes from each other. In such an embodiment, the sizes of a plurality of receiving holes 330a and 330b defined in the bottom plate of the bracket 300 may be different from each other.

As shown in FIG. 12, in an embodiment, the sizes of the first and second vibro-acoustic elements 250a and 250b and the sizes of the first and second vibration spaces 331a and 331b are different from each other, the frequency bands of the audio frequencies produced from regions where the first and second vibro-acoustic elements 250a and 250b are disposed may become different from each other. In such an embodiment, as the size of the vibro-acoustic elements 250a and 250b and the vibration spaces 331a and 331b is smaller, an audio frequency of a higher frequency band may be produced.

In an embodiment, as described above, the size of the vibro-acoustic elements 250a and 250b may mean an area where the vibro-acoustic elements 250a and 250b overlap the display panel 200, and the size of the vibration spaces 331a and 331b may mean the volume of the vibration spaces 331a and 331b.

Figure 13:
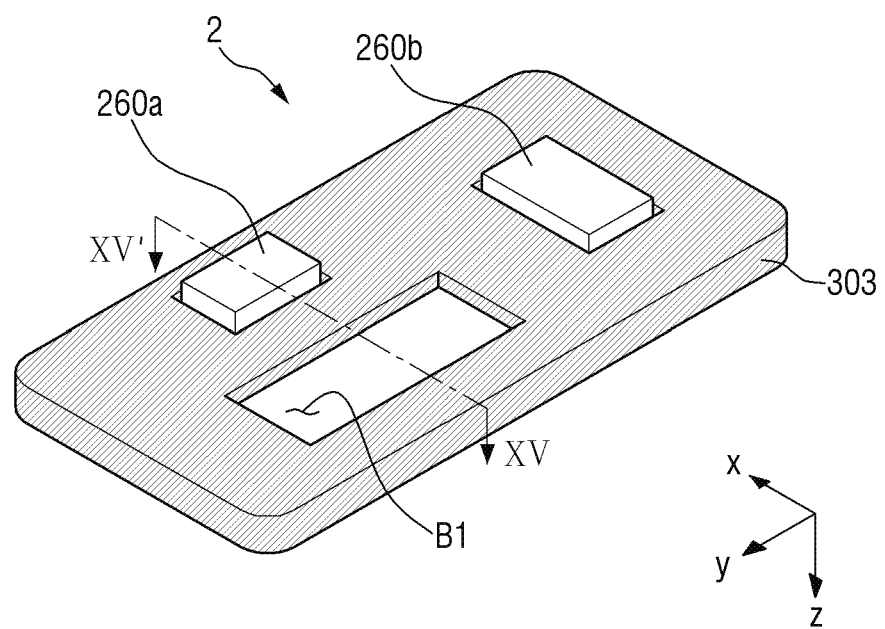
FIG. 13 is a perspective view showing a back side of a bracket of a display device according to still another alternative embodiment of the disclosure.
Figure 14:
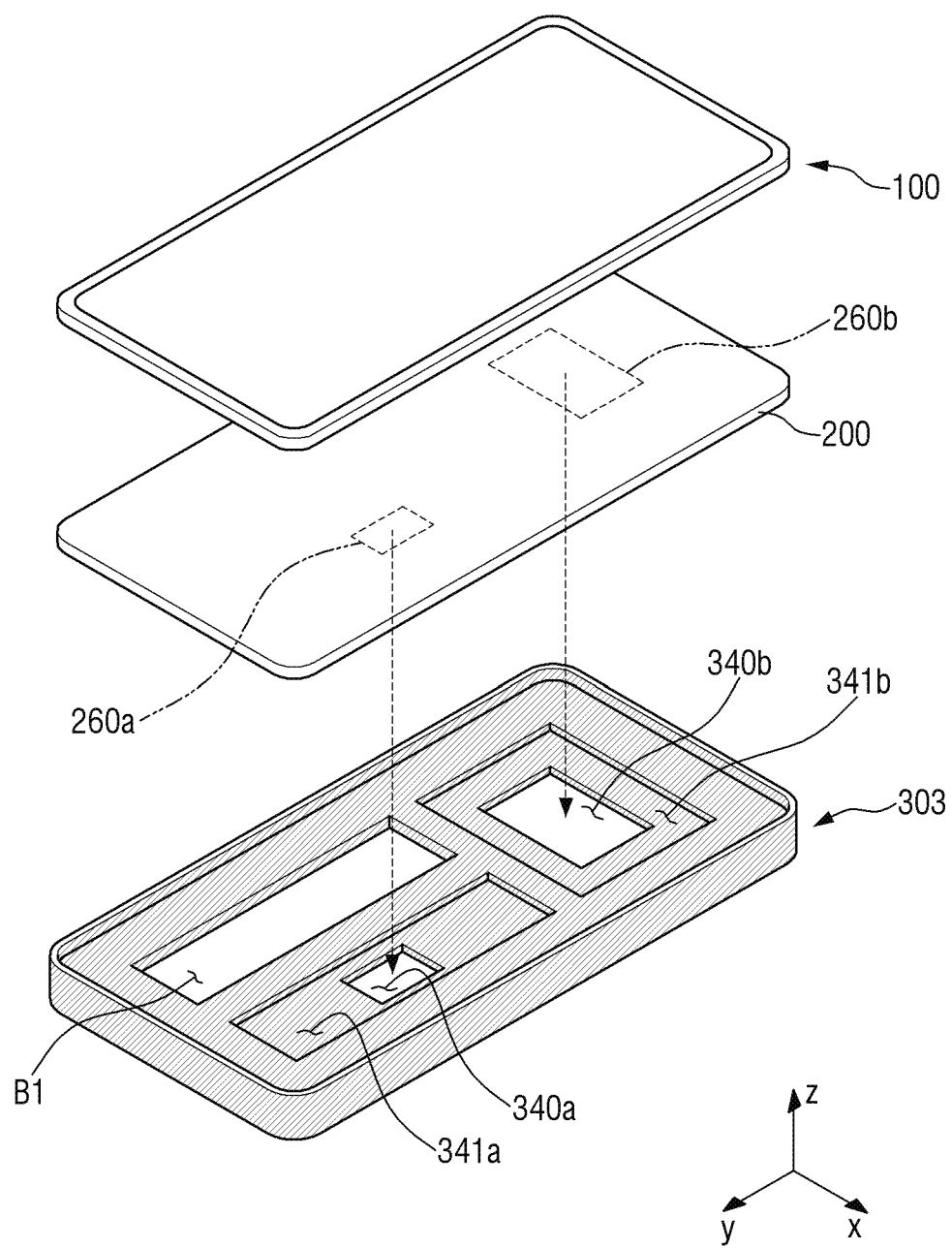
FIG. 14 is an exploded perspective view of the display device shown in FIG. 13.
Figure 15:
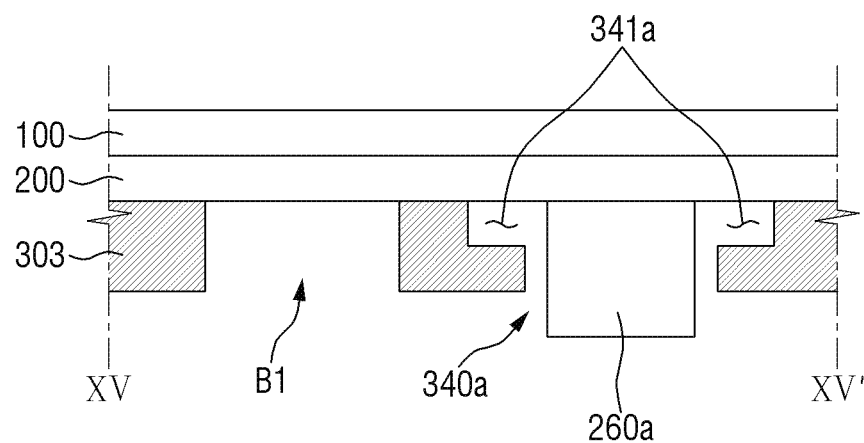
FIG. 15 is a cross-sectional view taken along line XV-XV' of FIG. 13.

FIG. 13 is a perspective view showing a back side of a bracket 303 of a display device 2 according to still another alternative embodiment of the disclosure. FIG. 14 is an exploded perspective view of the display device 2 shown in FIG. 13. FIG. 15 is a cross-sectional view taken along line XV-XV' of FIG. 13.

The display device 2 of FIGS. 13 to 15 is substantially the same as the display device described with reference to FIGS. 1 to 5 except that a battery receiving hole B1, in which a battery may be accommodated is defined in the bracket 303. For convenience of description, any repetitive detailed description of a same element will be omitted and differences will be mainly described.

Referring to FIGS. 13 to 15, in an embodiment, the battery receiving hole B1 for accommodating a battery may be further defined in the bottom plate of the bracket 303 in addition to a plurality of receiving holes 340a and 340b, in which a plurality of vibro-acoustic elements 260a and 260b are accommodated. The battery receiving hole B1 may be defined through the bottom plate of the bracket 303.

The battery refers to a member that supplies power to the display device 2, and is not limited in terms of its shape, size, material or the like. The shape and size of the battery receiving hole B1 may correspond to the shape and size of the battery so that the battery may be effectively received therein.

The battery receiving hole B1 may be spaced apart from the plurality of receiving holes 340a and 340b. In an embodiment, as shown in FIG. 14, when viewed from a plan view, the battery receiving hole B1 may be disposed at one lower end of the bracket 303, a first receiving hole 340a may be disposed at the other lower end of the bracket 303, and a second receiving hole 340b may be disposed at an upper side of the battery receiving hole B1 and the first receiving hole 340a. In an embodiment, the first vibro-acoustic element 260a having a relatively small size and which produces an audio frequency of a high frequency band and the first receiving hole 340a corresponding to the first vibro-acoustic element 260a may be arranged side by side with the battery receiving hole B1, and the second vibro-acoustic element 260b having a relatively large size and which produces an audio frequency of a low frequency band and the second receiving hole 340b corresponding to the second vibro-acoustic element 260b may be disposed in the remaining region where the battery receiving hole B1 and the first receiving hole 340a are not defined. However, the disclosure is not limited thereto. The position, size and the like of the plurality of vibro-acoustic elements 260a and 260b and the receiving holes 340a and 340b may be variously modified based on the shape and size of the battery receiving hole B1.

In an embodiment, the vibration spaces 341a and 341b defined in the periphery of the plurality of receiving holes 340a and 340b may be spaced apart from the battery receiving hole B1. In such an embodiment, a vibration space may not be formed in the battery receiving hole B1. The first vibration space 341a and the second vibration space 341b may have a same size as each other, but are not limited thereto. In alternative embodiments, the size relationship between the first vibration space 341a and the second vibration space 341b may be variously modified as described above.

Figure 16:
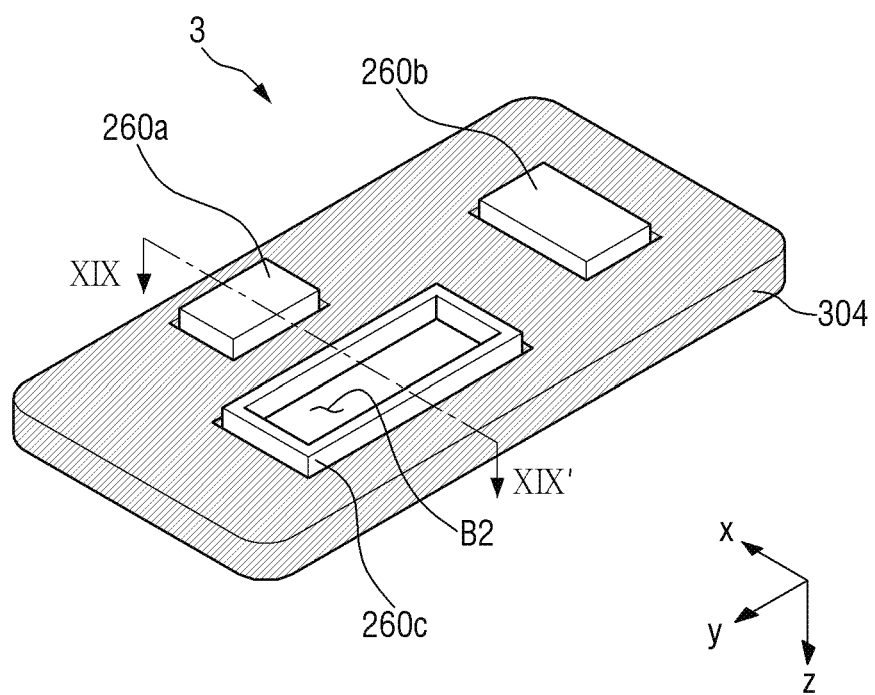
FIG. 16 is a perspective view showing a back side of a bracket of a display device according to still another alternative embodiment of the disclosure.
Figure 17:
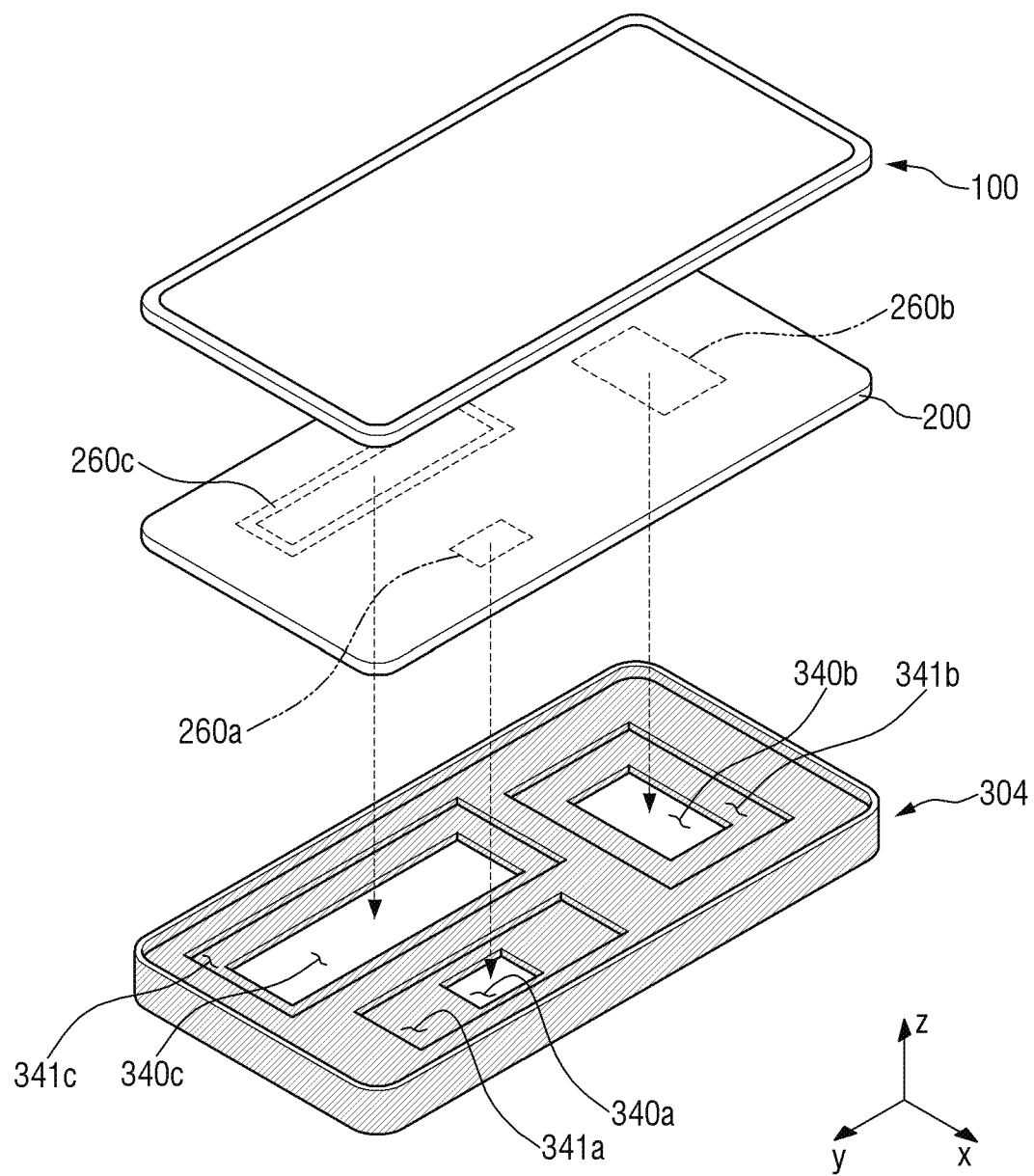
FIG. 17 is an exploded perspective view of the display device shown in FIG. 16.
Figure 18:
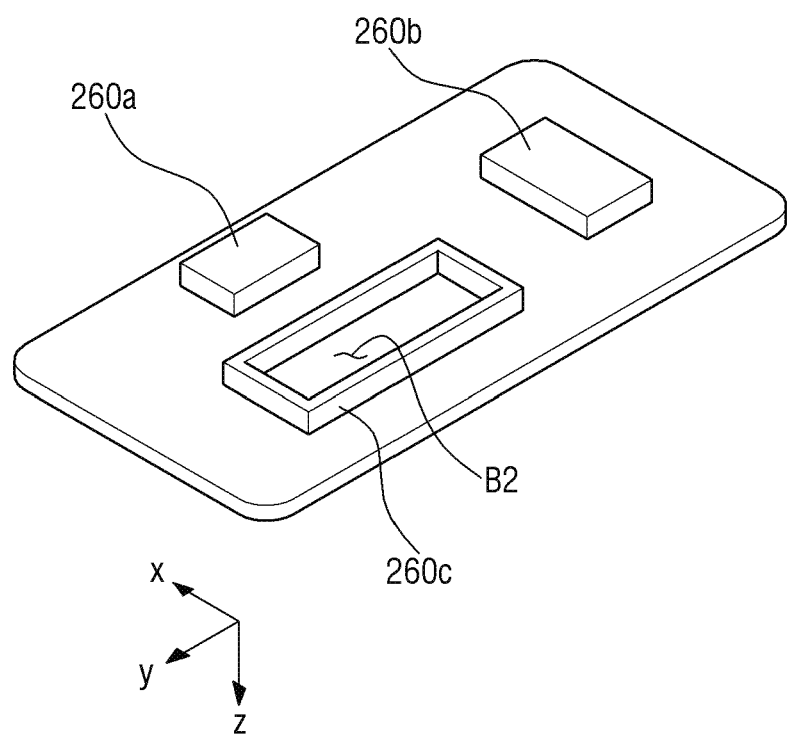
FIG. 18 is a perspective view showing a back side of a display panel shown in FIG. 17.
Figure 19:
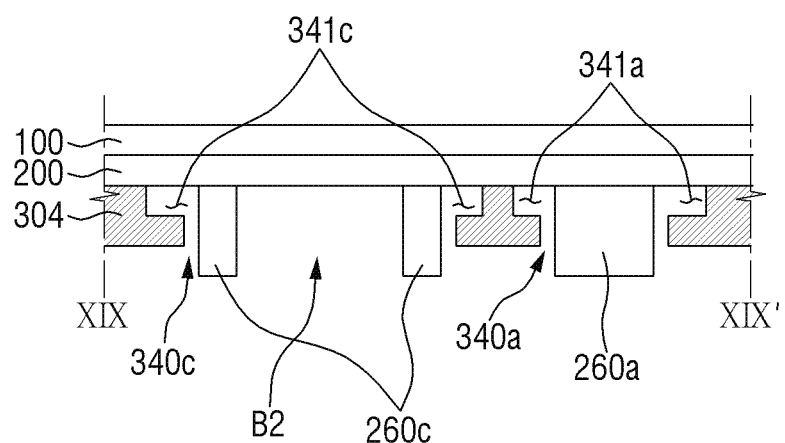
FIG. 19 is a cross-sectional view taken along line XIX-XIX' of FIG. 16.

FIG. 16 is a perspective view showing a back side of a bracket 304 of a display device 3 according to still another alternative embodiment of the disclosure. FIG. 17 is an exploded perspective view of the display device 3 shown in FIG. 16. FIG. 18 is a perspective view showing a back side of a display panel 200 shown in FIG. 17. FIG. 19 is a cross-sectional view taken along line XIX-XIX' of FIG. 16.

The display device 3 of FIGS. 16 to 19 is the same as the display device described with reference to FIGS. 13 to 15 except that it further includes a third vibro-acoustic element 260c having an opening B2 defined therein. For convenience of description, any repetitive detailed description of a same element will be omitted and differences will be mainly described.

Referring to FIGS. 16 to 19, in an embodiment, the third vibro-acoustic element 260c may be further disposed on the lower surface of the display panel 200, and a third receiving hole 340c may be further defined at a position corresponding to the bracket 304.

The third vibro-acoustic element 260c may have a rectangular frame shape with an opening B2 defined therein. The opening B2 may have a predetermined size and shape to accommodate the battery therein. In an embodiment, as shown in FIG. 19, when the display panel 200 and the bracket 304 are coupled to each other, the third vibro-acoustic element 260c may be positioned inside a rim of the third receiving hole 340c and the opening B2 of the third vibro-acoustic element 260c may serve as a battery receiving hole.

A third vibration space 341c for amplifying the vibration of the third vibro-acoustic element 260c may be disposed in the periphery of the third receiving hole 340c of the bracket 304.

In an embodiment, as described above, the third vibro-acoustic element 260c has a rectangular frame shape, but the disclosure is not limited thereto. In an alternative embodiment, the third vibro-acoustic element 260c may have a polygonal or closed curve frame shape. In another alternative embodiment, the third vibro-acoustic element 260c may have a shape corresponding to a part of the above-mentioned frame shape (e.g., a shape having two parallel line segments or '¬' shape). In such an embodiment, the shape of the third vibro-acoustic element 260c is not limited as long as the battery is effectively accommodated in the opening B2.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A display device comprising:
a display panel;
a plurality of vibro-acoustic elements coupled to the display panel and spaced apart from each other on a lower surface of the display panel; and
a bracket disposed below the display panel, the bracket including a bottom plate,
wherein
the bottom plate defines a plurality of openings, and
the plurality of vibro-acoustic elements is exposed through the plurality of openings, respectively,
wherein a first vibro-acoustic element of the plurality of vibro-acoustic elements is disposed in a first opening of the plurality of openings, and
wherein the first vibro-acoustic element does not contact the bracket.

2. The display device of claim 1, wherein a portion of the bottom plate defining an opening of the plurality of openings is recessed from an upper surface toward a lower surface of the bottom plate, and
wherein a vibration space is defined by the portion of the bottom plate recessed from the upper surface toward the lower surface of the bottom plate.

3. The display device of claim 1, wherein
audio frequencies in different frequency bands, respectively, are produced from regions in which the plurality of vibro-acoustic elements is disposed.

4. The display device of claim 3, wherein the plurality of vibro-acoustic elements has different sizes from each other to produce the audio frequencies in the different frequency bands, respectively.

5. The display device of claim 1, wherein at least one of the plurality of vibro-acoustic elements comprises a coil disposed on the lower surface of the display panel.

6. The display device of claim 1, wherein a vibro-acoustic element of the plurality of vibro-acoustic elements has a shape including at least a part of a frame shape in a plan view with an opening defined therein.

7. The display device of claim 1, wherein a size of a vibro-acoustic element of the plurality of vibro-acoustic elements is smaller than a size of an opening of the plurality of openings through which the vibro-acoustic element is exposed in a plan view.

8. A display device comprising:
a display panel;
a plurality of vibro-acoustic elements coupled to the display panel and spaced apart from each other on a lower surface of the display panel; and
a bracket disposed below the display panel, the bracket including a bottom plate,
wherein
the bottom plate defines a plurality of openings, and
the plurality of vibro-acoustic elements is exposed through the plurality of openings, respectively,
wherein at least one of the plurality of vibro-acoustic elements comprises a coil disposed on the lower surface of the display panel, and wherein the at least one of the plurality of vibro-acoustic elements further comprises a piezoelectric element disposed on the coil.

9. A display device comprising:
a display panel;
a plurality of vibro-acoustic elements coupled to the display panel and spaced apart from each other on a lower surface of the display panel; and
a bracket disposed below the display panel, the bracket including a bottom plate and a plurality of receiving holes which penetrates the bottom plate,
wherein the plurality of vibro-acoustic elements is disposed in the plurality of receiving holes, respectively,
wherein a battery receiving hole is defined through the bottom plate, and
wherein the battery receiving hole is spaced apart from the plurality of receiving holes.

10. The display device of claim 9, wherein a first portion of the bottom plate defining a receiving hole of the plurality of receiving holes is recessed from an upper surface toward a lower surface of the bottom plate, and
wherein a second portion of the bottom plate defining the battery receiving hole is not recessed.

11. A display device comprising:
a display panel;
a vibro-acoustic element coupled to the display panel; and
a bracket disposed below the display panel, the bracket including a bottom plate,
wherein the bottom plate defines an opening,
wherein the vibro-acoustic element is exposed through the opening,
wherein a size of the vibro-acoustic element is smaller than a size of opening in a plan view,
wherein the vibro-acoustic element is disposed in the opening, and
wherein the vibro-acoustic element does not contact the bracket.

12. The display device of claim 11, wherein the vibro-acoustic element comprises a coil disposed on the lower surface of the display panel.

13. The display device of claim 12, wherein the vibro-acoustic element further comprises a piezoelectric element disposed on the coil.

14. The display device of claim 11, further comprising:
a vibration reinforcing member disposed between the display panel and the vibro-acoustic element;
wherein the vibration reinforcing member is coupled to the display panel and the vibro-acoustic element.

15. The display device of claim 11, wherein the display panel is a diaphragm, such that at least a part of the display panel outputs sound in response to a vibration of the vibro-acoustic element.

16. The display device of claim 11, wherein the display panel comprises a display area and a non-display area, and
wherein the vibro-acoustic element and the receiving hole overlap the display area of the display panel.

17. A display device comprising:
a display panel;
a vibro-acoustic element disposed below a lower surface of the display panel; and
a bracket disposed below the vibro-acoustic element and which defines a vibration space and a receiving hole,
wherein the vibro-acoustic element is coupled to the display panel,
wherein a width of the vibration space is wider than a width of the receiving hole accommodate the vibro-acoustic element therein, and
wherein the vibration space is disposed closer to the display panel than the receiving hole.

18. A display device comprising:
a display panel;
a vibro-acoustic element disposed below a lower surface of the display panel; and
a bracket disposed below the vibro-acoustic element,
wherein the vibro-acoustic element comprises a coil disposed on the lower surface of the display panel and a piezoelectric element overlapping the coil, and
wherein the piezoelectric element includes a first electrode, a second electrode and a vibration material layer disposed between the first electrode and the second electrode.

19. The display device of claim 18, wherein the display panel comprises a display area and a non-display area, and
wherein the coil and the piezoelectric element overlap the display area of the display panel.

* * * * *